United States Patent [19]
Hoshino et al.

[11] Patent Number: 5,853,789
[45] Date of Patent: Dec. 29, 1998

[54] METHOD FOR PRODUCING TONYU

[75] Inventors: Masami Hoshino; Miyoko Yamasaki, both of Uji; Nobuyuki Ohshima, Osaka, all of Japan

[73] Assignee: Co. Lim Marushou, Osaka, Japan

[21] Appl. No.: 819,807

[22] Filed: Mar. 18, 1997

[30] Foreign Application Priority Data

May 31, 1996 [JP] Japan ..................................... 8-139081

[51] Int. Cl.⁶ ............................... A23L 1/20; C12C 3/08; C12G 2/40
[52] U.S. Cl. ........................... 426/634; 426/422; 426/592
[58] Field of Search .................................... 426/634, 592, 426/422

[56] References Cited

U.S. PATENT DOCUMENTS 3,937,843  2/1976  Osaka et al. ............................... 426/46

OTHER PUBLICATIONS

Database–Abstract–AN 83–805277 [44] WPIDS for JP 58–162253 published Sep. 26, 1983 (AJIN).

*Primary Examiner*—Anthony J. Weier
*Attorney, Agent, or Firm*—Armstrong, Westerman, Hattori, McLeland & Naughton

[57] ABSTRACT

Tonyu containing alcohol and the method for producing the Tonyu. Alcohol is added to beans soaked in water, Go or the liquid obtained after filtrating Go. Further, Tonyu containing alcohol is distilled under reduced pressure to obtain Tonyu with high solid content.

10 Claims, No Drawings

METHOD FOR PRODUCING TONYU

BACKGROUND OF THE INVENTION

1. Field of the Invention

The present invention relates to "Tonyu", which is liquid made of bean extract, and a method for producing Tonyu. More specifically, the present invention relates to Tonyu including alcohol and a method for producing Tonyu with the use of alcohol. The present invention also relates to concentrated Tonyu with high solid content and a method for producing concentrated Tonyu comprising distilling Tonyu with alcohol under reduced pressure.

2. Disclosure of Prior Art

Tonyu is made from beans and widely used to make various kinds of products, such as Tonyu beverage, Tofu and the like. Tonyu spoils easily because Tonyu is nutritious and the moisture content of Tonyu is very high. Therefore, it is difficult to store and convey Tonyu. Further, various wastes generated in the course of producing Tonyu burden manufacturers who make various products using Tonyu.

Some methods for producing Tonyu with high solid content which means concentrated Tonyu are disclosed (Japanese Laid-Open Publication No.50-95444 and Japanese Publication No. 56-52547). Concentrated Tonyu is convenient to be stored and conveyed. Concentrated Tonyu can be produced by distilling conventional Tonyu under reduced pressure, by the use of a flash dryer or by the use of a reverse osmosis membrane. Using a flash dryer or a reverse osmosis membrane is costly and is not practical. Distilling Tonyu under reduced pressure is a preferable method for industrially producing Tonyu with high solid content at a low cost.

However, conventional methods of distillation under reduced pressure have some problems. One of the problems is that liquid bubbles up heavily in a distillatory at the beginning of distillation to obstruct steam flow from the exit of the distillatory, thus a separation of gas and liquid is prevented. Another problem is increase of various germs in Tonyu in the course of distillation. Because these germs spoil Tonyu, the distillated Tonyu changes in quality, and the taste or the flavor of distillated Tonyu cannot be recovered even if the Tonyu is sterilized after distillation.

OBJECTS AND SUMMARY OF THE INVENTION

One of the objectives of the present invention is to produce Tonyu that does not spoil easily and maintains excellent quality even after being stored for a long time or conveyed. Tonyu having the above mentioned characteristics can be produced in a large amount by a Tonyu provider and then provided for a manufacturer who makes products made of Tonyu. Such a manufacturer can use required amount of Tonyu to make products made of Tonyu promptly.

Another objective of the present invention is to lighten the burdens of manufacturers of dispose of wastes and polluted water generated in course of producing Tonyu.

Another objective of the present invention is to stabilize quality of products made of Tonyu by providing Tonyu in excellent quality managed by a Tonyu provider.

A further objective of the present invention is to reduce the amount of wastes generated in course of producing Tonyu to make Tonyu efficiently.

We have studied on Tonyu that does not spoil easily and a method for producing the same. After we have studied, we have found a method for distilling Tonyu under reduced pressure that does not generate bubbles and germs. We have also studied an efficient method for producing Tonyu that does not generate wastes as much as conventional methods do. As the result of our researches, we have achieved the present invention.

Tonyu of the present invention contains alcohol.

In a preferred embodiment, Tonyu of the present invention can be produced by a method comprising the step of mixing alcohol in beans or a mixture including beans.

The expression "a mixture including beans" used herein comprehends a mixture of water and beans, water and beans products, Go, "Tonyu" and equivalents thereof. Alcohol can be added any step of producing Tonyu.

The term "Go" used herein means a mixture which is obtained by grinding down beans or which is prepared from bean products, and comprehends liquid both with or without alcohol.

The term "Tonyu" used herein means liquid obtained by filtrating Go to remove Okara, and comprehends liquid both with or without alcohol. The expression also comprehends both liquid which is sterilized by heating and not sterilized by heating.

The term "Okara" used herein means solid wastes generated after filtrating Go.

In a preferred embodiment, Tonyu of the present invention can be produced by a method comprising the steps of i) grinding down beans under the presence of alcohol to obtain Go; and ii) filtrating the resulting mixture to remove Okara.

In a preferred embodiment, Tonyu of the present invention can be produced by a method comprising the steps of i) adding alcohol to Go; and ii) filtrating the resulting mixture to remove Okara.

In another preferred embodiment, Tonyu of the present invention can be produced by a method comprising the steps of i) filtrating Go to remove Okara to obtain liquid; and ii) adding alcohol to the resulting liquid.

In another preferred embodiment, Tonyu of the present invention can be produced by a method comprising the steps of i) filtrating Go to remove Okara to obtain liquid; ii) sterilizing the obtained liquid by heating; and iii) adding alcohol to the sterilized liquid. In the method, the step of sterilizing by heating can be conducted in any process of after alcohol being added or before Go being filtrated.

Further, Tonyu of the present invention can be obtained by distilling the above mentioned Tonyu including alcohol under reduced pressure.

Preferably, alcohol used in the present invention means ethyl alcohol.

A method for producing Tonyu of the present invention comprises adding alcohol to a mixture including beans.

In a preferred embodiment, a method for producing Tonyu of the present invention comprises the steps of i) grinding down beans to obtain Go under the presence of alcohol; and ii) filtrating Go to remove Okara and obtain liquid. Optionally the obtained liquid can be concentrated by distillation under reduced pressure.

In a preferred embodiment, a method for producing Tonyu of the present invention comprises the steps of i) adding alcohol to Go; and ii) filtrating the resulting mixture to remove Okara and obtain liquid. Optionally, the obtained liquid can be concentrated by distillation under reduced pressure.

In another preferred embodiment, a method for producing Tonyu of the present invention comprises i) filtrating Go to remove Okara; and ii) adding alcohol to the resulting liquid. Optionally, the mixed liquid containing alcohol can be concentrated by distillation under reduced pressure.

In another preferred embodiment, a method for producing Tonyu of the present invention comprises i) filtrating Go to remove Okara to obtain liquid; ii) sterilizing the obtained liquid by heating; and iii) adding alcohol to the sterilized liquid. The process of heating can be conducted after alcohol being added or in any step before filtrating Go of the method. Optionally, the obtained liquid can be concentrated by distillation under reduced pressure.

Preferably, the alcohol of the present invention is ethyl alcohol.

In the present invention, alcohol in Tonyu enables the increase of the amount of Tonyu to be obtained and the reduction of the amount of Okara generated in course of producing Tonyu. Further, Tonyu including alcohol does not spoil easily because the increase of germs is inhibited by the operation of alcohol. Therefore, Tonyu including alcohol can be suitably stored and conveyed.

Tonyu including high solid content obtained by distillation under reduced pressure can be stored and conveyed easily. Tonyu with high solid content enables the prompt production of products made from Tonyu as much as required amount at any time.

Alcohol added in one of the steps of producing Tonyu prevents Tonyu from generating bubbles at the beginning of distillation under reduced pressure. Therefore, Tonyu can be concentrated easily. Further, the increase of germs in Tonyu during distillation can be suppressed because of the presence of alcohol, thus the concentrated Tonyu maintains its excellent quality.

In addition, the present invention lightens the burdens of manufacturers of disposal of various wastes and polluted water generated in the course of producing Tonyu.

Using Tonyu produced by the present invention stabilizes quality of products made of the Tonyu which is available from Tonyu providers.

DETAILED DESCRIPTION OF THE PRESENT INVENTION

Alcohol used in the present invention can be added as a food additive. Ethyl alcohol is preferred to be used for the present invention. Ethyl alcohol which can be used is commercially available as food additives, commercially available alcohol preparations or the like. The amount of alcohol to be added to a mixture including water and beans or liquid including bean extract is 3 weight % or more of the mixture or the liquid. Preferably, the amount of alcohol to be added is in the range of 3 to 30 weight %. More preferably, the amount of alcohol is in the range of 10 to 20 weight %. If the amount of alcohol to be added is below 3 weight %, alcohol can neither prevent the mixture or the liquid from being spoiled, nor inhibit the generation of bubbles and the increase of germs when Tonyu is distillated under reduced pressure. Further, if alcohol is contained in Go, the amount of Tonyu to be produced increases. There is no upper limit of the amount of alcohol to be added to the mixture or the liquid. However, 30 weight % or less alcohol is preferable. Above 20 weight % of alcohol can kill all germs that putrefy Tonyu. The number of general germs in the mixture or the liquid reaches the minimum when 30 weight % alcohol is added. Therefore, the number of general germs does not decrease even the amount of alcohol to be added increases. Further, when the amount of alcohol increases, the production of Tonyu becomes costly.

It is preferable to add alcohol to Go. Alcohol can be added to a mixture of water and beans. Alcohol can also be added to a commercially available bean products or the like to make Go including alcohol. Adding alcohol to the mixture or Go causes the decrease of the amount of resulting Okara and the increase of the amount of obtained Tonyu.

Alcohol can also be added to Tonyu that may or may not be sterilized by heating. Tonyu can also be prepared by mixing water and a dried Tonyu in powder.

Alcohol can be added at one time or added little by little during the steps of producing Tonyu to be finally in the range from 3 weight % to 30 weight % of the Tonyu. Tonyu containing alcohol does not spoil easily and maintains its excellent quality even after long storage or conveyance.

Alcohol can be recycled. It may be recovered after distilling Tonyu under reduced pressure and added again to the mixture of water and beans, Go or Tonyu.

In the present invention, various kinds of beans can be used. For example, such beans can be used as green peas, green soybeans, peas, soybeans and the like. Soybeans can be preferably used in the present invention. Crushed dry bean products, and dry beans in powder can also be preferably used.

Go can be produced either by a conventional method or in the presence of alcohol. More specifically, Go can be prepared by mixing water with commercially available products of crushed beans. Otherwise, beans can be selected, soaked in water and ground down to obtained Go, or alcohol can be added to the soaked beans and then the beans can be ground down to obtain Go. If Go contains alcohol, yield of Tonyu after filtrating Go increases.

Tonyu containing alcohol of the present invention can be obtained by the above mentioned processes. Tonyu containing alcohol of the present invention can also be obtained by adding alcohol to alcohol free Tonyu or adding alcohol and water to dried bean products. Tonyu can be heated or unheated. Tonyu containing alcohol can be stored or conveyed as it is because it does not spoil easily. Therefore, a step of sterilization, which is indispensable for producing conventional Tonyu, can be omitted.

Tonyu containing alcohol of the present invention may be frozen to be stored or conveyed. Preferably, Tonyu is not heated before being frozen. When heated Tonyu is frozen and thawed, Tonyu tends to form solid that separates from liquid.

Tonyu containing alcohol may be distilled under reduced pressure to obtain Tonyu with high solid content.

Adding alcohol to heat-sterilized Tonyu can inhibit the generation of bubbles at the beginning of distillation under reduced pressure, thus promotes distillation. Further, the rate of increase of germs in Tonyu can be regulated by adding alcohol. Heat-sterilized Tonyu may easily generate gels due to the denaturation of proteins in Tonyu, and the gels inhibit distillation. Therefore, the conditions of heat-sterilization should be set up so that gels may not be generated.

It is preferable to add alcohol to unheated Tonyu in the present invention. Adding alcohol to unheated Tonyu can inhibit the generation of bubbles at the beginning of the distillation and regulate the increase of germs. The rate of increase of germs in unheated Tonyu can be regulated as much as that in heated Tonyu when alcohol is added. Unheated Tonyu does not generate gels, thus easy to be distilled under reduced pressure. Further, unheated and concentrated Tonyu can maintain its excellent quality even after being frozen and thawed.

"Unheated Tonyu" used herein means liquid obtained by grinding down soaked or dried beans in the presence of water to produce suspension and filtrating the resulting suspension to remove Okara.

Alcohol may or may not be added to the liquid. The liquid is not heated for sterilization or denaturation.

It is preferable to add alcohol to Go, before or after grinding down beans, or at the time of grinding down beans. Then the resulting suspension is filtrated to remove Okara and distilled under reduced pressure. During the distillation, the generation of bubbles and the increase of germs are regulated.

A method for filtrating Go is not particularly limited. Preferably, Go can be filtrated by the use of a filter cloth. Any method of filtration known in the art can be used in the present invention as far as conditions of filtration are suitable.

Conditions for distilling under reduced pressure are not limited. Preferably, Tonyu is distilled at the temperature of 20° to 50° C. and the atmospheric pressure of 30 to 200 mmHg. More preferably, Tonyu is distilled at the temperature of 30° to 40° C. and at the atmospheric pressure of 50 to 100 mmHg. Tonyu having 10 to 50 weight % solid content can be obtained after original Tonyu is distilled to reduce its volume into ½ to ⅕.

"Solid content" used herein means residue obtained after dehydrating a moisture-rich food. Solid content (%) of food can be calculated by the formula 100—moisture content (%). The moisture content of food can be determined e.g., with the use of an infrared moisture meter FD-230 (kett) at approximately 105° C.

Concentrated Tonyu can be heated and diluted to desired amount to be used. For example, Tonyu having 20 weight % solid content can be diluted to 2.5 fold to obtain Tonyu with 8 weight % solid content, which may be used as a material for producing Tofu by a conventional method. Concentrated Tonyu having 20 weight % solid content can also be used as it is after being heated to produce concentrated soy source. Concentrated Tonyu can be diluted to desired rate to be used as materials for food made of beans, such as miso (soybean paste), beverages and the like.

Tonyu of the present invention with high solid content can be frozen to be stored. Frozen Tonyu can be stored for a long time and can be used in a required amount at any time for making products promptly.

More specifically, frozen Tonyu can be thawed, diluted to be a desired amount, and then used as materials for making products promptly that have the same quality as those made of conventional Tonyu. Concentrated Tonyu that is not heated before being distilled is preferably used because its quality does not change after being frozen and thawed.

Concentrated Tonyu can be heated after being frozen and thawed.

Tonyu obtained by being distilled under reduced pressure contains 2 to 5 times of solid component as much as conventional Tonyu does. Therefore, concentrated Tonyu can easily be stored and conveyed. Freezing Tonyu is more preferable process when it is stored and conveyed because germs do not increase when Tonyu is frozen. Frozen Tonyu can be conveyed to manufacturers of products by chill cars after being stored in freezers.

Typically, Tonyu can be used as a material for producing Tofu. For example, Tofu manufacturers can promptly produce required amount of Tonyu with the use of frozen Tonyu available from Tonyu providers. Conventionally, Tofu manufacturers have produced Tofu from beans and conduct all steps including the production of Tonyu. Therefore, it has been difficult to produce large number of Tofu promptly with the use of conventional method for producing Tofu. Tofu manufacturers' burdens can be reduced drastically by the present invention because the manufacturers have not to dispose of wastes and polluted water generated during the production of Tonyu. Manufacturing plants of the manufacturers can be in good sanitary condition with the use of Tonyu of the present invention. Further, the manufacturer can obtain Tonyu of excellent quality from Tonyu providers who use beans of good quality and water of good condition, thus the quality of Tofu can stably be in good condition.

When Tonyu of the present invention is distilled under reduced pressure, added alcohol promotes distillation of water by azeotropy. The obtained concentrated Tonyu is in good quality. The added alcohol changes the solubility of proteins in Tonyu. Therefore, the generation of bubbles at the beginning of the distillation is regulated due to the change of the viscosity and the surface tension of Tonyu. Alcohol also inhibits the increase of germs.

Tonyu and the method for producing Tonyu of the present invention are illustrated by examples with the use of soybeans. However, Tonyu of the present invention can be produced with the use of green peas, green soybeans, peas and the like and they also fall within the scope of the present invention. Alcohol preparations that will be allowed to be added to food in the future are also within the scope of the present invention. In addition, it is possible to produce sweets and the like with the use of Tonyu of the present invention. The present invention may be embodied in a changed, modified, or altered forms based on the knowledge of ordinary skilled in the art, without departing from the spirit and scope of the present invention.

EXAMPLES

The examples presented below are provided as a further guide to the practitioner of ordinary skill in the art, and are not to be construed as limiting the invention in any way.

Example 1 and Comparative Experiment 1

Each amount of Okara and Tonyu obtained after adding alcohol to Go is presented below. The results of bacterial tests with the obtained Tonyu are also presented. For comparison, each amount of Okara and Tonyu obtained by a method without using alcohol and the results of bacterial tests with the Tonyu are also presented.

Soybeans were washed and soaked in water at the room temperature of 10° to 15° C. for 12 to 16 hours. To the obtained soybeans of 100 g in weight, water of 700 g in weight was added. Then the soybeans were ground down to obtain Go. As a comparative sample, the obtained Go was filtrated to separate Okara and Tonyu. To examine the effect of alcohol, four samples were prepared. Ethanol 95 (a product of Shinwa Alcohol Sangyo Co., Inc.) was added to each sample to prepare Tonyu with 9.1%, 13.0%, 16.7% and 23.1% alcohol, respectively. Then, each sample was filtrated to separate Okara and Tonyu. Each amount and moisture content of obtained Okara and Tonyu from the samples are shown in Table 1. Infrared moisture meter FD-230 (kett) was used to determine the solid and moisture contents of the samples at approximately 105° C. The obtained Tonyu were also characterized.

Further, the number of general germs in Tonyu was also examined. To 10 g of each Tonyu, water of 90 ml was added. Then the mixture of Tonyu and water was put in a sterilized stomacher container and mixed with STOMACHER 400 LAB BLENDER (made in England) to obtain a diluted sample. Then, 1 ml of each sample was divided into two sterilized petri dishes. Next, 15 to 20 ml standard agarose culture medium was added to each petri dish to dilute the samples and the resulting culture mediums were left until the mediums were set. The mediums were then cultured at the temperature of 35° C. for 48 hours. The number of colonies in the mediums in the range of 30 to 300 was measured to calculate the number of germs per 1 g of sample.

The number of colitis germs in Tonyu was also counted by the use of desoxycholic acid mediums. By the use of the diluted samples described in the examination of general germs or samples of 10 times the diluted samples, 1 ml of each sample was divided into two sterilized petri dishes. Next, 15 to 20 ml standard agarose culture medium maintained at the temperature of 50° C. was added to each petri dish to dilute the samples and the resulting culture mediums were left until the mediums were set. Thereafter, the mediums were layered thinly and cultured at 35° C. for 24 hours. The number of red colonies in the mediums was measured to calculate the number of germs per 1 g of sample.

The number of other germs was also counted in the same way as the general germs except with the use of desoxycholic acid mediums and cultured for 24 hours.

TABLE 1

| Amount of alcohol (%) | 0 | 9.1 | 13.0 | 16.7 | 23.1 |
|---|---|---|---|---|---|
| Amount of Tonyu (g) A | 642.0 | 739.1 | 770.8 | 808.5 | 869.0 |
| Moisture content of Tonyu % B | 91.8 | 92.7 | 92.6 | 93.9 | 94.1 |
| Solid content of Tonyu % C = 100 − B | 8.2 | 7.3 | 7.4 | 6.1 | 5.9 |
| Solid content of Tonyu g D = A×C | 52.6 | 54.0 | 57.0 | 51.3 | 49.3 |
| Amount of Okara (g) AO | 123.0 | 102.0 | 97.0 | 100.0 | 102.0 |
| Moisture content of Okara (g) BO | 79.2 | 76.4 | 74.6 | 73.9 | 73.1 |
| Solid content of Okara % CO = 100 − BO | 20.8 | 23.6 | 25.4 | 26.1 | 26.9 |
| Solid content of Okara g DO = AO×CO | 25.6 | 24.6 | 24.1 | 26.1 | 27.4 |

TABLE 2

|  | Adding 13% alcohol to Go | Adding 13% alcohol to Tonyu | No alcohol |
|---|---|---|---|
| General germs (number/gram) | $1.4 \times 10^4$ | $3.4 \times 10^4$ | $1.6 \times 10^5$ |
| Colitis germs (n/g) | 0 | 0 | 0 |
| Germs in desoxycholic acid mediums (n/g) | 0 | $3 \times 10$ | $8 \times 10$ |

Example 2 and Comparative Experiment 2

Whole soybeans of 90 g were washed and soaked in water at the room temperature of 13° C. for 15 hours. To the soaked soybeans, 10 g defatted soybeans and water were added to make a mixture of 800 g. Then the mixed soybeans were ground down to obtain Go. Meiol 89 (a product of Mercian Co., Inc.) which is neutralized in advance to pH 7.5, was added to make a preparation of 13% alcohol in weight. The preparation was filtrated to separate Okara and Tonyu.

The obtained Tonyu was 775.2 g. in weight. 575 g out of the obtained 775.2 g Tonyu was put in an eggplant type flask to be distilled at a temperature of 35° C. under the pressure of 100 mmHg. The Tonyu in the flask was easily distilled to make 102.1 g Tonyu with 39.5% solid content without bubbles. Go without ethanol was also filtrated and the obtained Tonyu was distillated under reduced pressure as a comparative experiment. Table 3 shows the results of required hours to obtain concentrated Tonyu, taste of concentrated Tonyu, and the numbers of general germs in concentrated Tonyu.

TABLE 3

|  | Alcohol added | No alcohol |
|---|---|---|
| Required hours for concentration | 2.5 hours | 3 hours |
| General germs in concentrated Tonyu | $1.4 \times 10^3$ n/g | $1.6 \times 10^5$ n/g |
| Quality of Tofu made of concentrated Tonyu | good | sour, no good |

Example 3 and Comparative Experiment 3

To 1020 g of unheated Tonyu with 19% solid content, food additive ethanol 95 (a product of Shinwa Alcohol Sangyo Co., Inc.) was added to prepare Tonyu with 15% alcohol. The obtained Tonyu was distilled at 35° C. and 100 mmHg. Volume of the distilled Tonyu was easily reduced to ½ of original volume due to the regulation of bubbling. Tonyu without alcohol was also distillated in the same process as the Tonyu with alcohol as a comparative experiment. Tonyu without alcohol was difficult to be distillated because Tonyu bubbled up to the exit of steam at the beginning of distillation. Therefore, Tonyu was concentrated slowly with the lowered pressure of 200 mmHg in order to control bubbles.

Table 4 shows the conditions of distillation, characteristics of concentrated Tonyu and the numbers of germs in concentrated Tonyu.

The number of general germs in Tonyu was also examined as germ 1.

To 10 g of each Tonyu, 90 ml water was added. Then the mixture of Tonyu and water was put in a sterilized stomacher container and mixed with STOMACHER 400 LAB BLENDER (made in England) to obtain diluted samples. Then 1 ml of each sample was divided into two sterilized petri dishes. Next, 15 to 20 ml standard agarose culture medium was added to each petri dish to dilute the samples and the resulting culture mediums were left until the mediums were set. The mediums were then cultured at 35° C. for 48 hours. The number of colonies in the mediums in the range of 30 to 300 was measured to calculate the number of germs per 1 g of sample.

As germ 2, the number of other germs was also counted in the same way as the general germs except with the use of desoxycholic acid mediums and cultured for 24 hours.

The viscosity of Tonyu was determined with the use of TOKIMEC VISCOMETER. The conditions of distillation were observed visually. When Tonyu was easily distilled, ○ is put, when Tonyu was distilled normally, Δ is put and when Tonyu was difficult to be distilled, X is put in the Table 4. Flavor, color and other characteristics of distilled Tonyu were sensed. Tofu produced by 1) thawing concentrated and frozen Tonyu and diluting it to prepare Tonyu of 11% solid content; and 2) adding 0.3% coagulant gluconodeltalactone. Then the obtained Tofu was tasted.

TABLE 4

|  | Example 3 | Com. Ex. 3 |
|---|---|---|
| Added amount of ethanol (%) | 15 | 0 |
| Tonyu before distillation (solid content 19%) | | |
| Germ 1 (n/g) | $4.5 \times 10^5$ | $1.5 \times 10^7$ |
| Germ 2 (n/g) | 0 | $1.5 \times 10^5$ |
| Viscosity(mPa · S) | 220 | 125 |
| Easiness of distillation | ○ | x |
| Concentrated Tonyu (solid content 39%) | | |
| Germ 1 (n/g) | $5.8 \times 10^5$ | more than $10^8$ |
| Germ 2 (n/g) | $3 \times 10$ | $1.1 \times 10^5$ |
| Smell | smell of Tonyu | smell of oil |
| Color | white | yellowish |
| Other qualities | good | no good |
| Concentrated and frozen Tonyu | | |
| Quality of Tofu | same as the conventional | rotten smell |

As shown in Table 4, alcohol in Tonyu not only promotes distillation but also inhibits the increase of general germs in Tonyu before and after distillation. As a result, concentrated Tonyu maintains good quality and thus concentrated and frozen Tonyu can be used as a material for producing Tofu.

Example 4 and Comparative Experiment 4

To 3000 g of unheated Tonyu of 14% solid content, food additive ethanol 95 (a product of Shinwa Alcohol Sangyo Co., Inc.) was added to prepare Tonyu with 18.7% alcohol. The obtained mixture was distilled at 35° C. and 100 mmHg. Tonyu was easily concentrated to be 39% solid content. The obtained Tonyu was diluted to prepare Tonyu of 10% solid content. Then the diluted Tonyu was heated at 121° C. for 10 min. The heated Tonyu was tasted. Unheated Tonyu of 10% solid content obtained after filtrating alcohol-free Go was also tasted. Taste, flavor, color and other characteristics of both Tonyu were the same. Both Tofu made of concentrated Tonyu and Tofu made of unheated unconcentrated Tonyu were good in their characteristics such as flavor, taste, and color.

Next, concentrated Tonyu of 39% solid content was frozen at −20° C. for a week and thawed. Then the Tonyu was diluted to prepare Tonyu of 10% solid content. Then the diluted Tonyu was heated at 121° C. for 10 min. The heated Tonyu was tasted. Unheated Tonyu obtained after filtrating alcohol-free Go was also tasted. Taste, flavor, color and other characteristics of both Tonyu were the same. Both Tofu made of concentrated Tonyu that was frozen and thawed and Tofu made of unheated unconcentrated Tonyu were good in their characteristics such as flavor, taste, and color.

Examples 5 to 12 and Comparative Experiment 5

Experiments were conducted under the same condition described in example 3 except each amount of alcohol that was added to Tonyu. Each amount of alcohol varied from 2.5 to 35%. The result of the experiments are shown in Table 5. Tonyu of 5 to 30% alcohol was easily distilled. Specially, Tonyu of 10 to 20% alcohol was easily distilled. When ethyl alcohol was added to Tonyu or concentrated Tonyu to make Tonyu of more than 5% etyl alcohol, the number of germs decreased. The effect of alcohol was confirmed in comparison with the experiment without alcohol.

TABLE 5

|  | Added amount of ethanol | Tonyu before distillation (solid content 14%) | | | Easiness of distillation | Concentrated Tonyu (solid cohntent 39%) | |
|---|---|---|---|---|---|---|---|
|  |  | Viscosity | Germ 1 | Germ 2 |  |  |  |
| unit | % | mPa.S | n/g | n/g |  | n/g | n/g |
| Co. Ex. 5 | 0 | 105 | $1.5 \times 10^7$ | $1.5 \times 10^5$ | x | $10^8 <$ | $1.1 \times 10^6$ |
| Ex. 5 | 2.5 | 105 | $1.2 \times 10^7$ | $1.1 \times 10^5$ | x | $4.7 \times 10^7$ | $7.5 \times 10^5$ |
| Ex. 6 | 5 | 113 | $3.2 \times 10^6$ | $6.5 \times 10^4$ | Δ | $6.8 \times 10^6$ | $1.3 \times 10^5$ |
| Ex. 7 | 10 | 130 | $8.7 \times 10^5$ | $2.6 \times 10^4$ | ○ | $1.0 \times 10^6$ | $8.7 \times 10^4$ |
| Ex. 8 | 15 | 313 | $4.5 \times 10^5$ | 0 | ○ | $5.8 \times 10^5$ | $3 \times 10$ |
| Ex. 9 | 20 | 503 | $2.3 \times 10^5$ | 0 | ○ | $4.3 \times 10^5$ | 0 |
| Ex. 10 | 25 | 410 | $1.6 \times 10^5$ | 0 | ○ | $3.8 \times 10^5$ | 0 |
| Ex. 11 | 30 | 350 | $1.4 \times 10^5$ | 0 | ○ | $3.4 \times 10^5$ | 0 |
| Ex. 12 | 35 | 325 | $1.3 \times 10^5$ | 0 | ○ | $3.1 \times 10^5$ | 0 |

Example 13 and Comparative Experiment 6

Experiments with the use of heated Tonyu is shown below. Tonyu of 9% solid content was heated at the temperature of 90° C. for 2 hours. Then ethyl alcohol was added to the heated Tonyu to make Tonyu of 15% ethyl alcohol and the resulting solution was distilled under the same condition described in Example 2. For a comparative experiment, Tonyu without alcohol was also distilled. Table 6 shows the state of Tonyu during distillation. The taste, color and other characteristics of concentrated Tonyu and the number of germs in concentrated Tonyu are also shown in the Table. The heated Tonyu was easily distilled just as unheated Tonyu was due to the regulation of bubbles. The flavor, color and other characteristics of concentrated Tonyu were the same as those of conventional Tonyu.

TABLE 6

|  | Example 13 | Com. Ex. 6 |
|---|---|---|
| Added amount of ethanol (%) | 15 | 0 |
| Easiness of distillation | ○ | x |

TABLE 6-continued

|  | Example 13 | Com. Ex. 6 |
|---|---|---|
| Concentrated Tonyu (solid content 23%) |  |  |
| Germ 1 (n/g) | $2.3 \times 10^5$ | $4.0 \times 10^5$ |
| Germ 2 (n/g) | 0 | 0 |
| Smell | smell of Tonyu | smell of Tonyu |
| Color | white | yellowish |
| Other qualities | good | good |

Example 14

An experiment comprising the step of adding alcohol to a mixture of beans and water to produce Tonyu is shown below.

To 300 g of whole soybeans, 2550 g water was added and the beans were roughly crushed with the use of a cutter mixer. To the resulting suspension, 450 g of 89% alcohol was added and the mixture was ground down to obtain Go.

The obtained Go was filtrated by a filter cloth to separate Okara from Tonyu. The obtained Tonyu of 2370 g was distilled in an eggplant type flask to obtain 427 g concentrated Tonyu with 36.6% solid content.

The concentrated Tonyu was diluted to prepare Tonyu with 10% solid content and heated at the temperature of 90° C. Tofu was produced from the obtained Tonyu. The resulting Tofu was tasted. The color, flavor, taste, and other characteristics of the Tofu were excellent.

Example 15

To 80 g commercially available defatted soybeans (products of Yoshihara Seiyu Co., Inc.), water was added to make 800 g of mixture. The mixture was ground down to make Go, and the Go was filtrated by a filter cloth to separate Okara from Tonyu. To the obtained Tonyu, Ethanol 95 (a product of Shinwa Alcohol Sangyo Co., Inc.) was added to make Tonyu with 13% alcohol. 575 g of the obtained Tonyu with 13% alcohol was put in an eggplant type flask and distillated at the temperature of 35° C. and at the pressure of 100 mmHg. The Tonyu was distilled easily without bubbling and 94.6 g of concentrated Tonyu with 50% solid content was obtained. The concentrated Tonyu was diluted to make Tonyu with 10% solid content. The Tonyu was then heated at the temperature of 90° C. before Tofu was produced. The resulting Tofu was tasted. The taste, color, flavor and other characteristics of Tofu were in good condition.

While the present invention has been disclosed in connection with the preferred embodiment thereof, it should be understood that there may be other embodiments which fall within the spirit and scope of the invention as defined by the following claims.

What is claimed is:

1. A method for producing Tonyu comprising the steps of:
    grinding down beans to obtain Go, filtering the Go to remove Okara and collecting a solution of Tonyu,
    wherein said method further comprises the step of adding 3 to 25 weight % of alcohol in beans or mixture of beans and water at any stage of producing Tonyu, said solution of Tonyu including 3 to 25% by weight of alcohol, such that said solution of Tonyu can be concentrated by distillation under reduced pressure without bubble formation or germ formation.

2. A method for producing Tonyu according to claim 1 comprising the steps of:
    grinding down beans under the presence of alcohol to obtain Go containing 3 to 25 weight % of alcohol;
    filtering the Go to remove Okara and form a solution of Tonyu including 3 to 25% by weight of alcohol; and
    collecting said solution of Tonyu including 3 to 25 weight % of alcohol, such that said solution of Tonyu can be concentrated by distillation without bubble formation or germ formation.

3. A method for producing Tonyu according to claim 1 comprising the steps of:
    grinding down beans to obtain Go;
    adding alcohol to the Go to make a mixture including 3 to 25 weight % of alcohol;
    filtering the mixture to remove Okara and form a solution of Tonyu including 3 to 25% by weight of alcohol; and
    collecting said solution of Tonyu including 3 to 25 weight % of alcohol, such that said solution of Tonyu can be concentrated by distillation without bubble formation or germ formation.

4. A method for producing Tonyu according to claim 1, comprising the steps of:
    grinding down beans to obtain Go;
    filtering Go to remove Okara and collect a solution of Tonyu; and
    adding alcohol to the obtained solution of Tonyu to make a solution of Tonyu including 3 to 25% of alcohol, such that said solution of Tonyu can be concentrated by distillation without bubble formation or germ formation.

5. A method for producing Tonyu according to claim 1, wherein said alcohol is ethyl alcohol.

6. The method for producing Tonyu comprising the steps of:
    grinding down beans to obtain Go, filtering the Go to remove Okara and collecting a solution of Tonyu,
    wherein said method further comprises the step of adding 3 to 30 weight % of alcohol in beans or mixture of beans and water at any stage of producing Tonyu, said solution of Tonyu including 3 to 30% by weight of alcohol, such that said solution of Tonyu can be concentrated by distillation under reduced pressure without bubble formation or germ formation; and
    distilling said solution of Tonyu including 3 to 30% by weight alcohol to obtain a concentrated Tonyu product.

7. A method for producing Tonyu according to claim 6 comprising the steps of:
    grinding down beans under the presence of alcohol to obtain Go containing 3 to 30 weight % of alcohol;
    filtering the Go to remove Okara and form a solution of Tonyu including 3 to 30% by weight of alcohol;
    collecting said solution of Tonyu including 3 to 30 weight % of alcohol; and
    distilling said solution of Tonyu including 3 to 30 weight % of alcohol under reduced pressure, without bubble formation or germ formation, to obtain a concentrated Tonyu product.

8. A method for producing Tonyu according to claim 6 comprising the steps of:
    grinding down beans to obtain Go;
    adding alcohol to the Go to make a mixture including 3 to 30 weight % of alcohol;
    filtering the mixture to remove Okara and form a solution of Tonyu including 3 to 30% by weight of alcohol;

collecting said solution of Tonyu including 3 to 30 weight % of alcohol; and distilling the solution of Tonyu including 3 to 30 weight % of alcohol under reduced pressure, without bubble formation or germ formation, to obtain a concentrated Tonyu product.

9. A method for producing Tonyu according to claim 6, comprising the steps of:

grinding down beans to obtain Go;

filtering Go to remove Okara and collect a solution of Tonyu;

adding alcohol to the obtained solution to make a solution of Tonyu including 3 to 30 weight % of alcohol; and distilling the solution of Tonyu including 3 to 30 weight % of alcohol under reduced pressure, without bubble formation or germ formation, to obtain a concentrated Tonyu product.

10. A method for producing Tonyu according to claim 6, wherein said alcohol is ethyl alcohol.

* * * * *